United States Patent
Edwards et al.

(10) Patent No.: US 10,846,968 B1
(45) Date of Patent: Nov. 24, 2020

(54) SYSTEMS AND METHODS FOR ELECTRONIC VOTING USING AN ATM

(71) Applicant: Capital One Services, LLC, McLean, VA (US)

(72) Inventors: Joshua Edwards, Philiadelphia, PA (US); Michael Mossoba, Arlington, VA (US); Abdelkader M'Hamed Benkreira, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/730,312

(22) Filed: Dec. 30, 2019

(51) Int. Cl.
| | |
|---|---|
| *G07C 13/00* | (2006.01) |
| *G07F 19/00* | (2006.01) |
| *G06Q 20/10* | (2012.01) |
| *G06Q 40/02* | (2012.01) |

(52) U.S. Cl.
CPC ......... *G07C 13/00* (2013.01); *G06Q 20/1085* (2013.01); *G06Q 40/02* (2013.01); *G07F 19/207* (2013.01); *G06Q 2230/00* (2013.01)

(58) Field of Classification Search
CPC .... G07C 13/00; G06Q 20/1085; G06Q 20/18; G06Q 2230/00; G07F 19/20; G07F 19/211
USPC ...................................... 235/386, 51; 705/12
See application file for complete search history.

(56) References Cited

U.S. PATENT DOCUMENTS

| | | | |
|---|---|---|---|
| 7,421,410 B1* | 9/2008 | Schechtman ........ | G06Q 20/105 705/35 |
| 2003/0136835 A1* | 7/2003 | Chung ................... | G07C 13/00 235/386 |
| 2003/0212593 A1* | 11/2003 | Weiss ..................... | G06Q 20/18 705/12 |
| 2004/0243573 A1* | 12/2004 | Keenan ................. | G06F 16/903 |
| 2005/0263593 A1* | 12/2005 | Collins, Jr. ........... | G06Q 30/08 235/386 |
| 2006/0273169 A1* | 12/2006 | Fleischman ........... | G07C 13/00 235/386 |
| 2007/0192176 A1 | 8/2007 | Onischuk | |
| 2008/0173715 A1* | 7/2008 | Liberman .............. | G07C 13/00 235/386 |
| 2009/0230192 A1* | 9/2009 | Ghafarzadeh ......... | G07C 13/00 235/386 |

(Continued)

OTHER PUBLICATIONS

Jay MacDonald, ATMs as voting machines: An idea whose time hasn't come, https://www.creditcards.com/credit-card-news/atm-voting-machinpes-1273.ph, Sep. 15, 2008.

(Continued)

*Primary Examiner* — Suezu Ellis
(74) *Attorney, Agent, or Firm* — DLA Piper LLP US

(57) ABSTRACT

Computerized methods and systems for electronic voting are disclosed. Electronic voter registration information from a voting jurisdiction can be received. The electronic voter registration information can be matched to verified identity information for customers of the financial institution. Information indicating that the one or more customers are registered to vote at a polling location associated with the financial institution can be stored. Based on the stored information, the customers can be enabled to submit votes for the elections using computing devices associated with the financial institution.

18 Claims, 6 Drawing Sheets

(56) References Cited

U.S. PATENT DOCUMENTS

2013/0144686 A1* 6/2013 Hotto .................... G07C 13/00
  705/12
2019/0213820 A1* 7/2019 Sebes .................... G07C 13/00

OTHER PUBLICATIONS

Know Your Customer article, https://en.wikipedia.org/wiki/Know_your_customer, Wikipedia, Sep. 20, 2019.

* cited by examiner

SYSTEMS AND METHODS FOR ELECTRONIC VOTING USING AN ATM

FIELD

Systems and methods described herein relate to the field of electronic voting.

BACKGROUND

Polling locations are often not efficient, and this can cause long lines. In addition, important elections can also cause long lines if the number of voters is higher than expected. Polling locations are often not equipped to handle 100% turnout of potential voters.

Long lines, bad weather, traffic, work issues, childcare issues, or other conditions can cause people who want to vote to decide against it, particularly when designated voting areas are not convenient to voters. In addition, voting administration can have a significant cost, because, for example, many voting stations are used and monitored. Systems and methods for voting described herein can help make it easier and more convenient to vote.

SUMMARY

Figure 1:
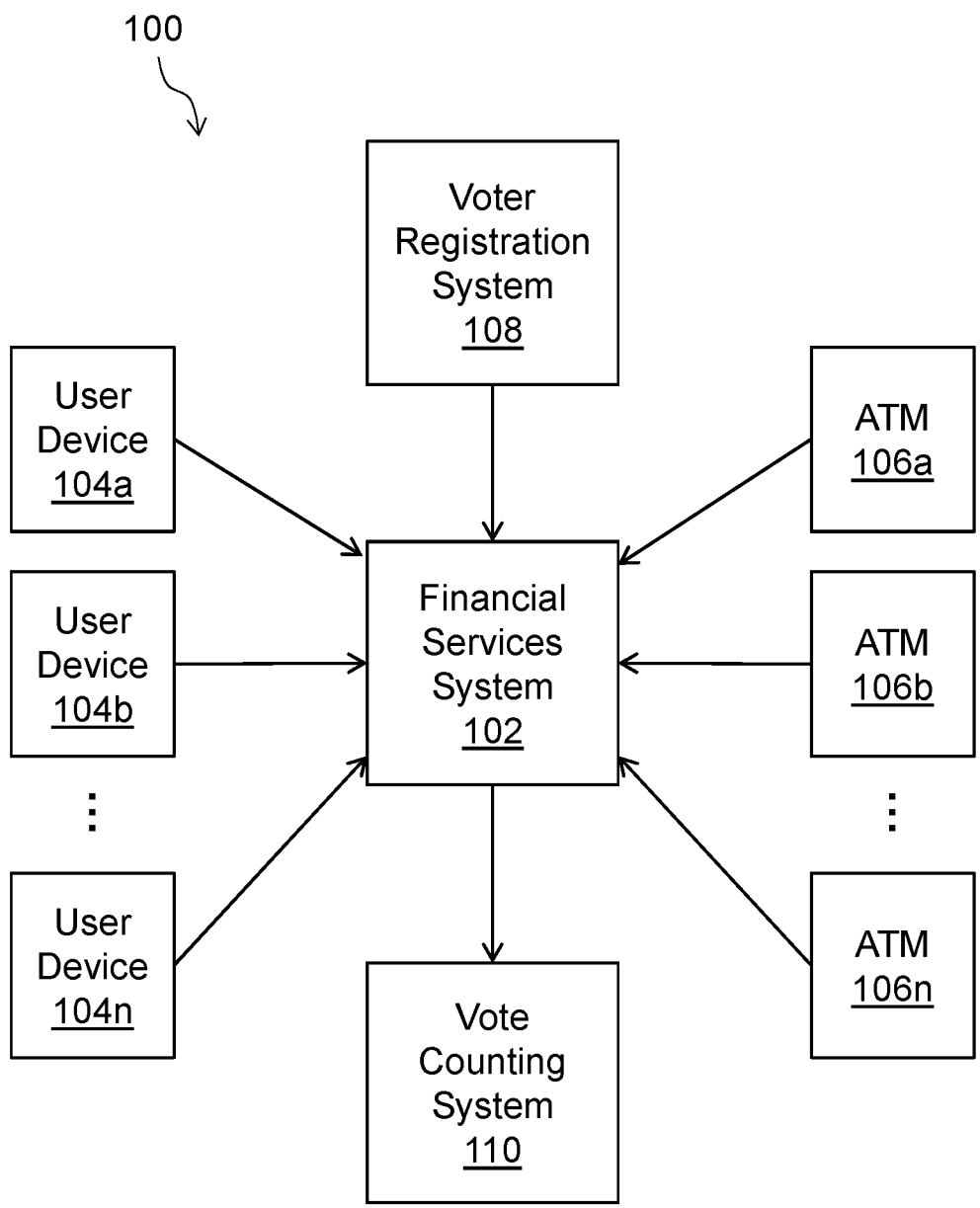
FIG. 1 illustrates a system for electronic voting, according to aspects of the disclosure.

In aspects of the disclosure, a computer-implemented method can include: receiving, at a server device associated with a financial institution, electronic voter registration information from a voting jurisdiction, the electronic voter registration information valid for one or more elections of the voting jurisdiction; matching the electronic voter registration information to verified identity information for one or more customers of the financial institution; storing, in a database communicably coupled to the server device, information indicating that the one or more customers are registered to vote at a polling location associated with the financial institution; and enabling, based on the stored information, the one or more customers to submit votes for the one or more elections using one or more computing devices associated with the financial institution.

In aspects of the disclosure, receiving electronic voter registration information from the voting jurisdiction can include receiving account numbers for the one or more customers, wherein matching the electronic voter registration information to the verified identity information for one or more customers can include matching the received account numbers to account numbers stored by the financial institution for the one or more customers.

In aspects of the disclosure, enabling the one or more customers to submit votes for the one or more elections can include: receiving authentication credentials from a first computing device from the one or more computing devices; identifying a first customer from the one or more customers based on the received authentication credentials; sending, to the first computing device, vote choices for a first election from the one or more elections; receiving, from the first computing device, vote selections for the first election; and storing the vote selections to a secure storage device.

In aspects of the disclosure, the first computing device can include an automated teller machine (ATM).

In aspects of the disclosure, one or more sensors coupled to the ATM can capture the biometric data of the first customer; and the biometric data can be stored in an auditing database.

In aspects of the disclosure, receiving the vote selections for the first election can include receiving the vote selections via an mobile app associated with the financial institution.

In aspects of the disclosure, one or more cameras coupled to the ATM, can capture photo and video data of the one or more customers.

In aspects of the disclosure, a method of electronic voting can include: verifying the identity of a plurality of customers of a financial institution; receiving, by one or more processors of a service device, authentication credentials for a first customer from the plurality of customers, the server device associated with a financial institution; authenticating, by the one or more processors, the customer using the received authentication credentials; determining, based on a current date and a current time, that voting is open for an election associated with a voting jurisdiction; determining, by the one or more processors, that the first customer is registered to vote, in the election, at a polling location associated with the financial institution, the polling location comprising an automated teller machine (ATM) or a user device; receiving, by the one or more processors, one or more vote selections input by the customer at the polling location; and securely transmitting the one or more vote selections to a server device associated with the voting jurisdiction.

In aspects of the disclosure, a computer-implemented system can include: a memory storing instructions; and a processor that, when executing the instructions, is configured for: receiving, at a financial institution server device, electronic voter registration information from a voting jurisdiction, the electronic voter registration information valid for one or more elections of the voting jurisdiction; matching the electronic voter registration information to a database communicably coupled to the financial institution server device, the database comprising verified identity information for one or more customers of a financial institution; accepting, at a computer device of the one or more customers, voting information for the one or more elections; sending, from the computer device, the voting information to the financial institution server device; and storing, in a database communicably coupled to the financial institution server device, the voting information.

In aspects of the disclosure, the computer device can be a mobile device. The mobile device can include a laptop computer, a mobile phone, a mobile tablet computer, or any combination thereof. The computer device can be a desktop computer.

In aspects of the disclosure, authentication information from the one or more customers can be received at an ATM communicably coupled to the server device; and the voting information can be securely transmitted to a voting jurisdiction server device associated with the voting jurisdiction upon authentication of the one or more customers.

In aspects of the disclosure, electronic voter registration information can be received from the voting jurisdiction and can include receiving account numbers for the one or more customers.

In aspects of the disclosure, the electronic voter registration information can be matched to the verified identity information for one or more customers by matching the received account numbers to account numbers and/or other account information stored by the financial institution for the one or more customers.

In aspects of the disclosure, the processor is further configured for: capturing, by one or more sensors coupled to the ATM, biometric data of the first customer; and storing the biometric data in an auditing database.

In aspects of the disclosure, receiving the one or more vote selections can include receiving the vote selections via an mobile app associated with the financial institution.

DETAILED DESCRIPTION OF EMBODIMENTS

Systems and methods for electronic voting can make it easier and more convenient to vote. This system and method can assist with government voting (e.g., federal, state, local), private voting (e.g., credit union leadership or contest, company stockholders), or any type of public vote (e.g., TV show contest, sports All-Star game contest), or any combination thereof. For example, one of the reasons for the slowness at polling locations is the identification requirement. Financial institutions (e.g., banks, credit unions, etc.) have Know Your Customer (KYC) requirements, and thus already have a method to confirm the identity of their customers. KYC can be the process of a business (e.g., a financial institution) verifying the identity of its clients and assessing their suitability, along with the potential risks of illegal intentions towards the business relationship. KYC can also refer to bank regulations and due diligence information. More information on KYC can be found at the Sep. 20, 2019 Wikipedia Know Your Customer article (https://en.wikipedia.org/wiki/Know_your_customer), which is herein incorporated by reference.

Customers have different means of authenticating with financial institution systems. In some aspects of the disclosure, customers can register with a financial institution as their polling location. In some aspects, customers can also tie their voting registration information to their account information, so that the financial institution would know which customers are registered to vote with them. In order to register, account numbers can be received for customers, and the electronic voter registration information can be matched to the verified identity information for the customers, and can include matching the received account numbers to account numbers stored by the financial institution for the customers. In addition, a voting jurisdiction can provide information about the person which is cross-referenced to the information on file. For example, the government might provide a social security number (SSN); or a stockholder vote might provide an email address. With either of these, the system can look up a customer's existing account information, or register new account information based on the customer's information. A public vote may be used to confirm that the voter hasn't already used their account number, so the system can save the account number at the time of the vote.

In some aspects of the disclosure, on election days, customers can be given the option to select how they would like to vote. This option can be provided after customers authenticate their identity. Reminders of election days and time frames can also be provided to customers.

In some aspects of the disclosure, customers can submit their votes using an automated teller machine (ATM) tied to the financial institution. In some aspects, customers can use a computer device (e.g., computer, smart phone, smart watch, tablet) to vote, save their selections, go to an ATM or other financial institution device and authenticate, and then submit their ballot to the ATM or other financial institution device. This option can prevent malicious actors that have compromised customers credentials from being able to submit ballots, as the customer can be required to authenticate in person. Information received by a customer, such a in a mobile app or at an ATM, can include: an SSN, a name/address, an email address, a phone number, a membership number, etc. In addition, the customer's selected votes can be captured. Submitting votes at an ATM or other financial institution device can also allow biometric checks. In addition, photo and/or video footage from security cameras can be used for voting auditing.

FIG. 1 illustrates a system 100 for electronic voting, according to aspects of the disclosure. The system 100 can include: a voter registration system 108, ATMs (e.g., 106a, 106b, and 106n), a vote counting system 110, user devices (e.g., 104a, 104b, 104n), or a financial services system 102, or any combination thereof. The voter registration system 108 can register voters. The ATMs can be in communication with the financial services system 102 and can be used by the voters to authenticate the voting information for the voters. The vote counting system 110 can count the votes. The user devices can be used to vote and can send the voting information to the financial institutions and/or polling institutions.

Figure 2:
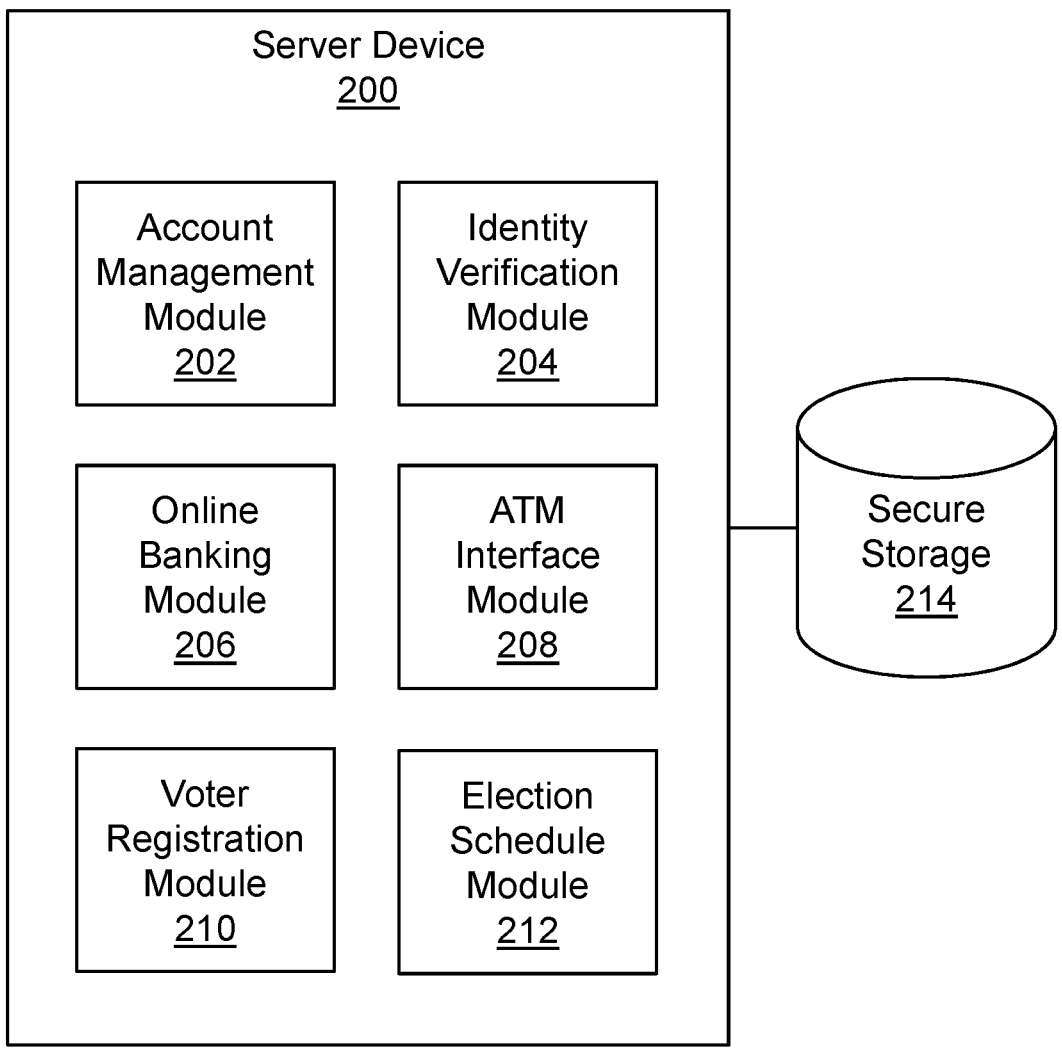
FIG. 2 illustrates a server device for electronic voting, according to aspects of the disclosure.

FIG. 2 illustrates a server device 200 for electronic voting, according to aspects of the disclosure. The server device 200 can include: an account management module 202, an identity verification module 204, an online banking module 206, an ATM interface module 208, a voter registration module 210, or an election schedule module 212, or any combination thereof. The server device can be connected to secure storage 214. The account management module 202 can store account information for the customers of the financial institution. The identity verification module 204 can verify the identity of the customers. The online banking module 206 can enable the users to perform certain functions (e.g., including voting) related to their account from their mobile device and/or desktop computer. The ATM interface module 208 can interface and share information with the online banking module 206 and/or the account management module 202. The voter registration module 210 can enable the customers to register to vote. The election schedule module 212 can include election schedule information and/or can remind the customers about elections.

Figure 3:
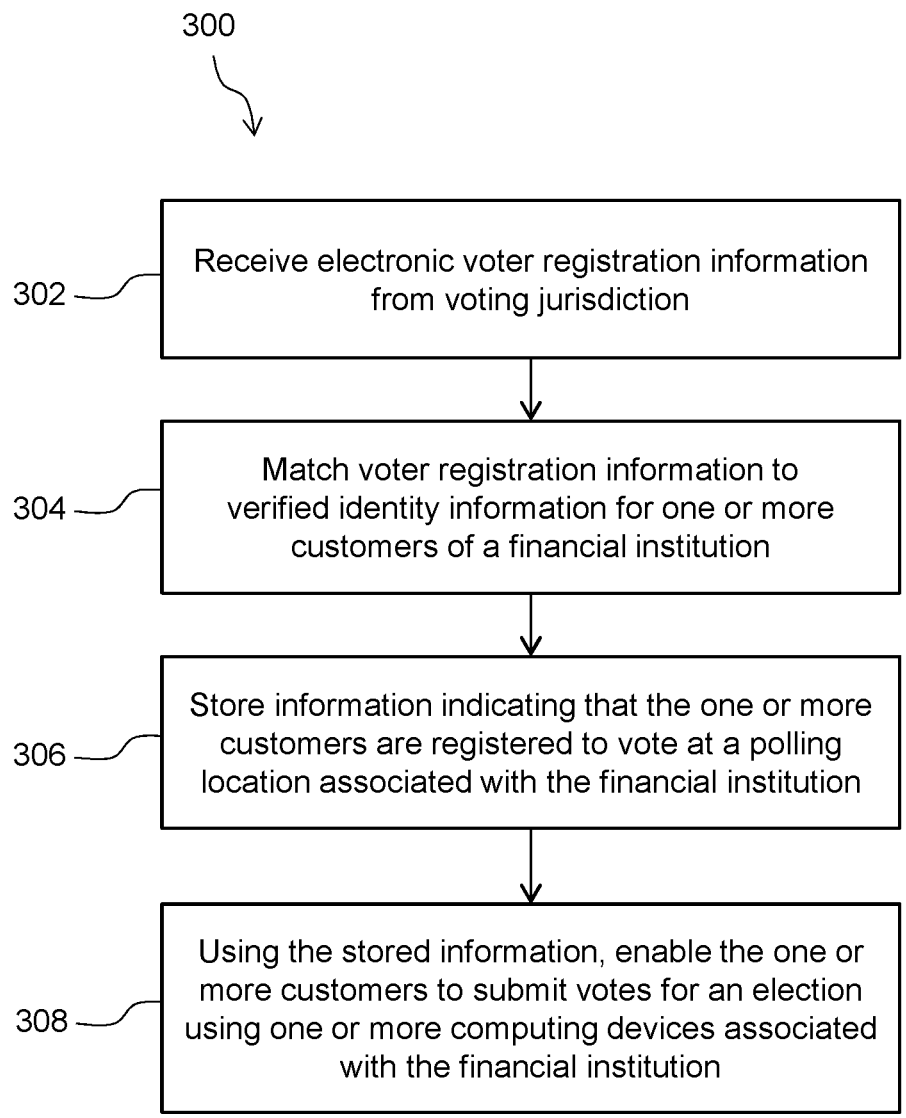
FIGS. 3-4 are example methods for electronic voting, according to aspects of the disclosure.

FIG. 3 is an example method 300 for electronic voting, according to aspects of the disclosure. In 302, electronic voter registration information can be received from a voting jurisdiction. In 304, the voter registration information can be matched to verify identify information for one or more customers of a financial institution. In 306, information indicating that the one or more customers are registered to vote at a polling location associated with the financial institution can be stored. In 308, the stored information can be used to enable the one or more customers to submit votes for an election using one or more computer devices associated with the financial institution. The stored information can include information indicating that the customer is a valid voter for the election. The stored information can be valid for multiple elections, and the stored information can determine which vote is valid for which day. The stored information can include customer information that can be used to authenticate and confirm the customers. The stored information can also include customer selections (e.g., if the customer pre-filled this information in a ballot at home).

Figure 4:
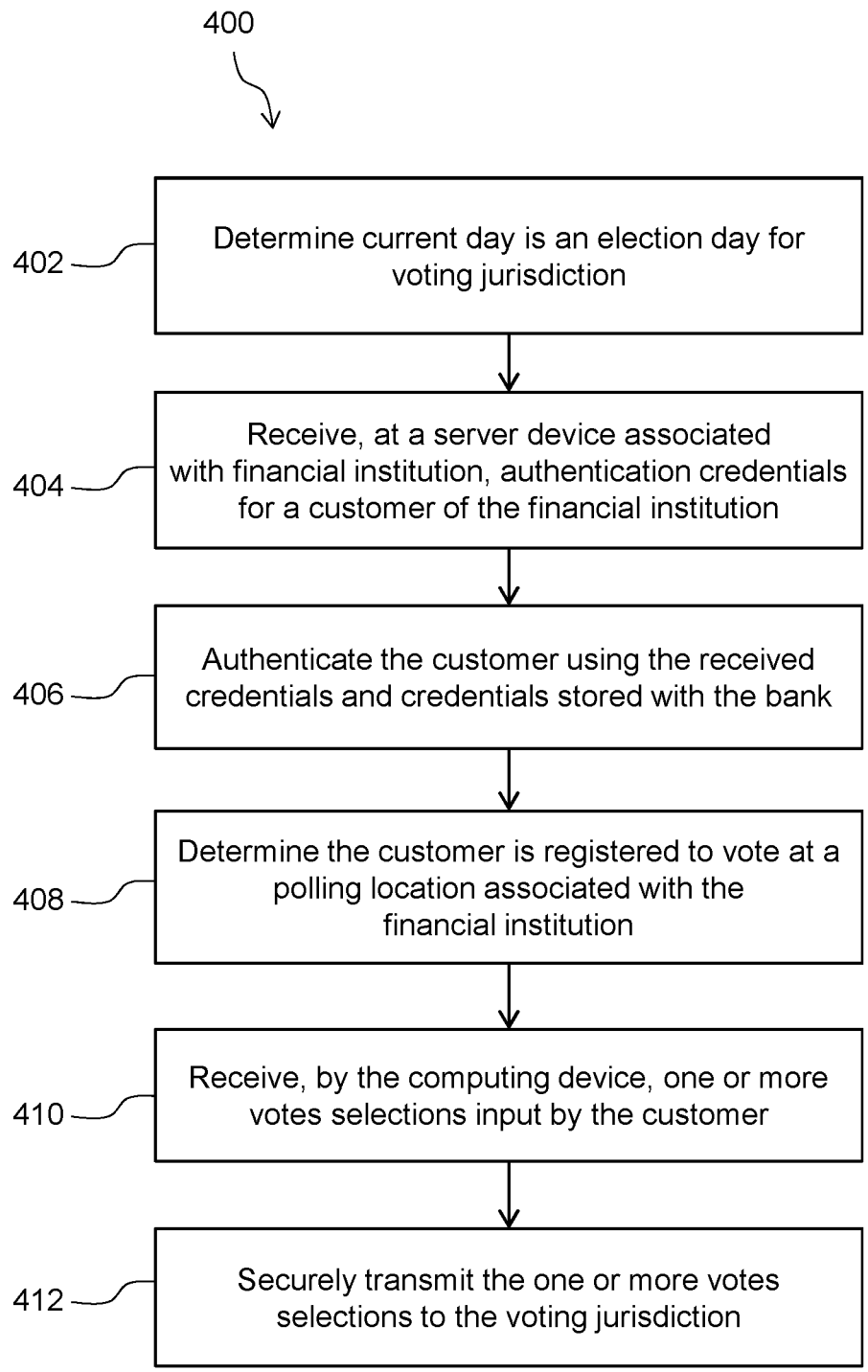

FIG. 4 is an example method 400 for electronic voting, according to aspects of the disclosure. In 402, the current day can be determined as an election day for a voting jurisdiction. In 404, authentication credentials for a customer of the financial institution can be received at a server device associated with the financial institution. Authentication credentials can include: a card and/or a PIN (personal identification number), a biometric (e.g., fingerprint, facial recognition, palm scanning, iris scanning, etc.), an authentication token received from a user device (e.g., a mobile phone, one-time code, username and/or password). In 406, the customer can be authenticated using the received credentials and credentials stored with the financial institution (e.g., bank). In 408, it can be determined that the customer is registered to vote at a polling location associated with the financial institution. In 410, one or more vote selections input by the customer can be received by the computing device. In 412, the one or more votes can be securely transmitted to the voting jurisdiction.

Methods described herein may represent processing that occurs within a system for electronic voting. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Figure 5:
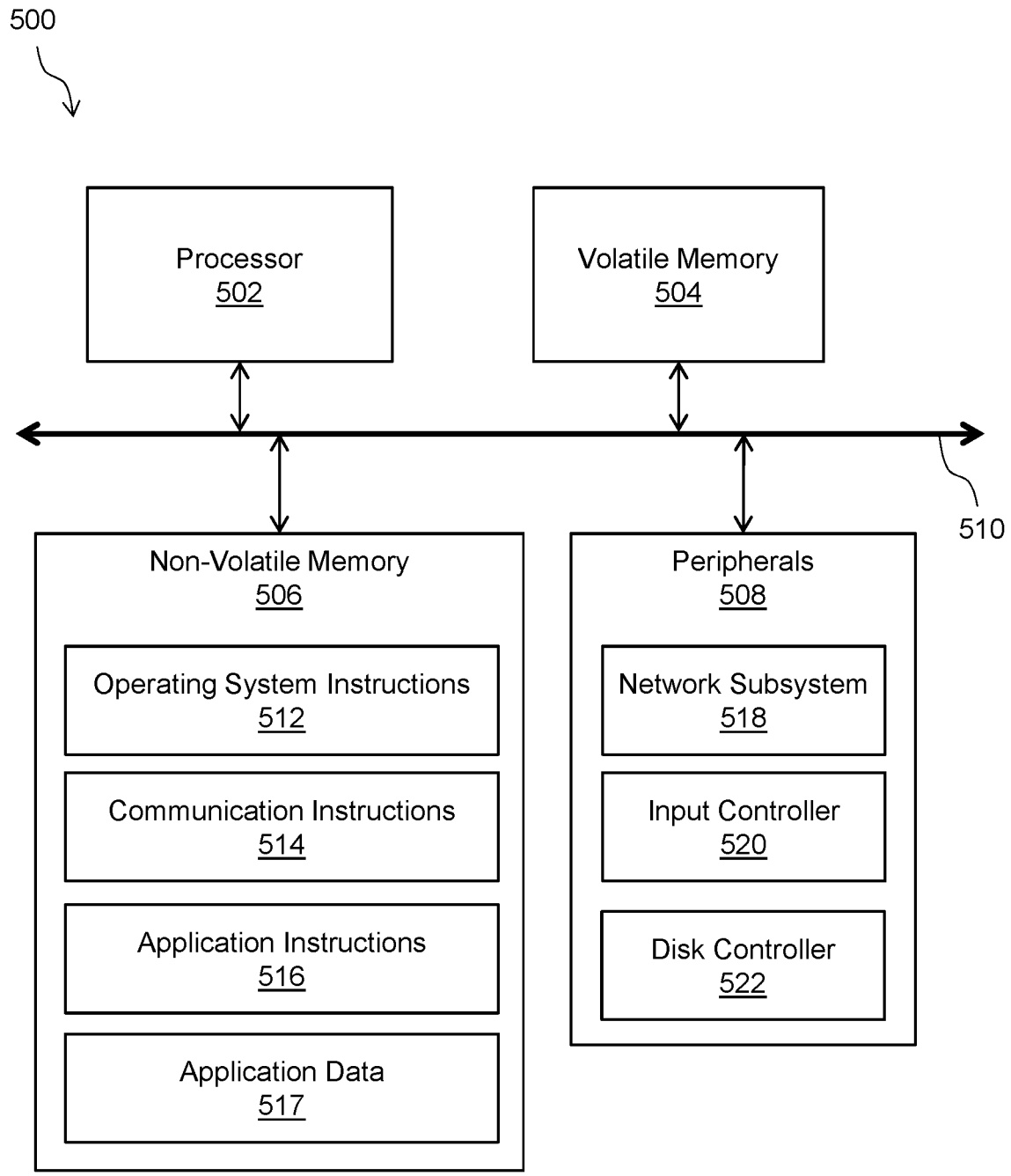
FIG. 5 illustrates an example server device that may implement various features and processes as described herein, according to aspects of the disclosure.

FIG. 5 shows an illustrative server device 500 that may implement various features and processes as described herein. The server device 500 may be implemented on any electronic device that runs software applications derived from compiled instructions, including without limitation personal computers, servers, smart phones, media players, electronic tablets, game consoles, email devices, etc. In some implementations, the server device 500 may include one or more processors 502, volatile memory 504, non-volatile memory 506, and one or more peripherals 508. These components may be interconnected by one or more computer buses 510.

Processor(s) 502 may use any known processor technology, including but not limited to graphics processors and multi-core processors. Suitable processors for the execution of a program of instructions may include, by way of example, both general and special purpose microprocessors, and the sole processor or one of multiple processors or cores, of any kind of computer. Bus 510 may be any known internal or external bus technology, including but not limited to ISA, EISA, PCI, PCI Express, NuBus, USB, Serial ATA or FireWire. Volatile memory 504 may include, for example, SDRAM. Processor 502 may receive instructions and data from a read-only memory or a random access memory or both. The essential elements of a computer may include a processor for executing instructions and one or more memories for storing instructions and data.

Non-volatile memory 506 may include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 506 may store various computer instructions including operating system instructions 512, communication instructions 514, application instructions and data 516. Operating system instructions 512 may include instructions for implementing an operating system (e.g., Mac OS®, Windows®, or Linux). The operating system may be multi-user, multiprocessing, multitasking, multithreading, real-time, and the like. Communication instructions 514 may include network communications instructions, for example, software for implementing communication protocols, such as TCP/IP, HTTP, Ethernet, telephony, etc. Application instructions and data 516 can include instructions and data to perform some of the processing described.

Peripherals 508 may be included within the server device 500 or operatively coupled to communicate with the server device 500. Peripherals 508 may include, for example, network interfaces 518, input devices 520, and storage devices 522. Network interfaces may include for example an Ethernet or WiFi adapter. Input devices 520 may be any known input device technology, including but not limited to a keyboard (including a virtual keyboard), mouse, track ball, and touch-sensitive pad or display. Storage devices 522 may include one or more mass storage devices for storing data files; such devices include magnetic disks, such as internal hard disks and removable disks; magneto-optical disks; and optical disks.

Figure 6:
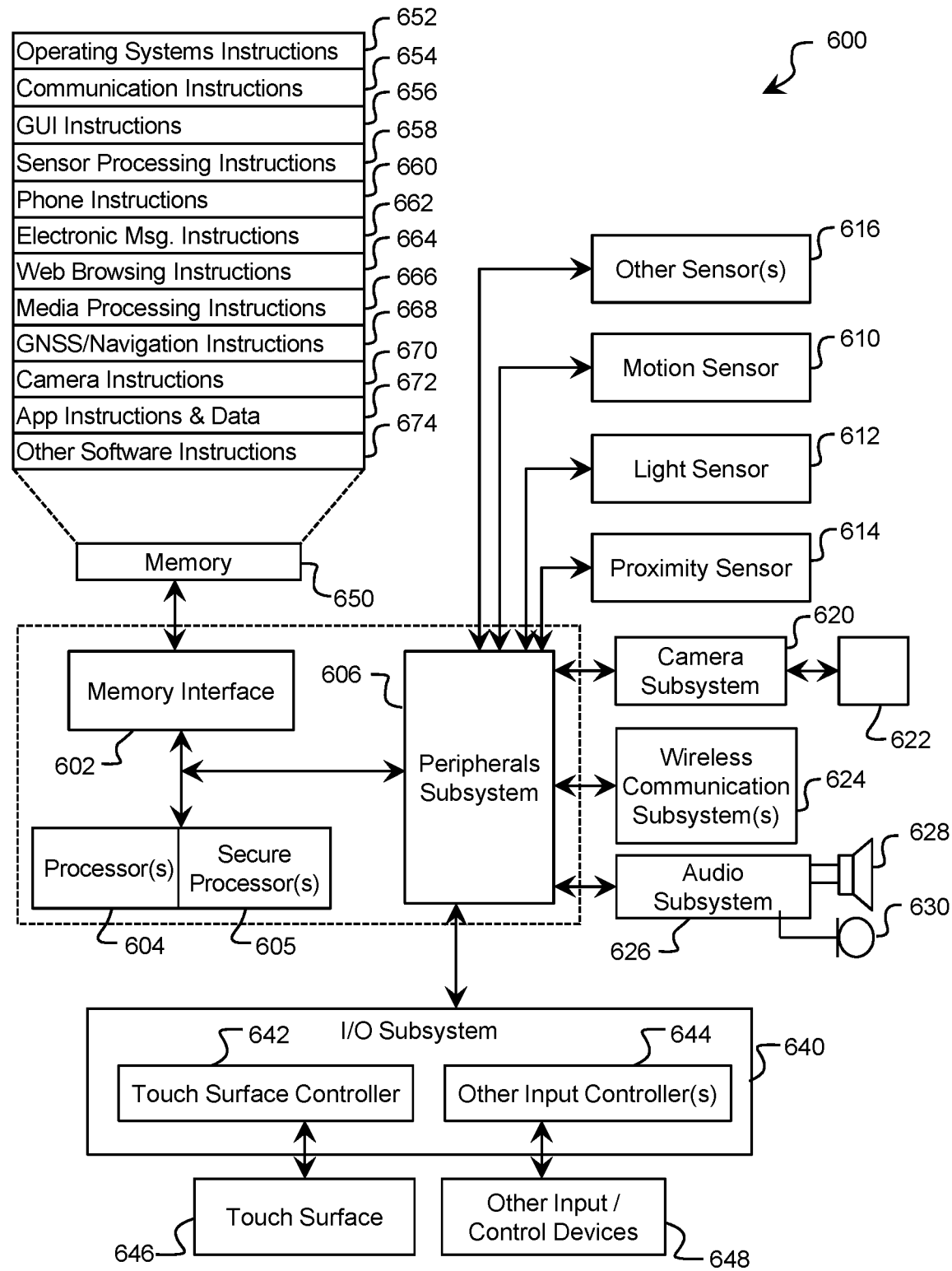
FIG. 6 illustrates an example user device, according to aspects of the disclosure.

FIG. 6 shows a user device 600, according to an embodiment of the present disclosure. The illustrative user device 600 may include a memory interface 602, one or more data processors, image processors, central processing units 604, and/or secure processing units 605, and a peripherals interface 606. The memory interface 602, the one or more processors 604 and/or secure processors 605, and/or the peripherals interface 606 may be separate components or may be integrated in one or more integrated circuits. The various components in the user device 600 may be coupled by one or more communication buses or signal lines.

Sensors, devices, and subsystems may be coupled to the peripherals interface 606 to facilitate multiple functionalities. For example, a motion sensor 610, a light sensor 612, and a proximity sensor 614 may be coupled to the peripherals interface 606 to facilitate orientation, lighting, and proximity functions. Other sensors 616 may also be connected to the peripherals interface 606, such as a global navigation satellite system (GNSS) (e.g., GPS receiver), a temperature sensor, a biometric sensor, magnetometer, or other sensing device, to facilitate related functionalities. The sensors can help confirm that the ATM hasn't been compromised, and if it is suspected that the ATM was compromised, the ATM can disable the ability to vote there.

A camera subsystem 620 and an optical sensor 622, e.g., a charged coupled device (CCD) or a complementary metal-oxide semiconductor (CMOS) optical sensor, may be utilized to facilitate camera functions, such as recording photographs and video clips.

Communication functions may be facilitated through one or more wired and/or wireless communication subsystems 624, which can include radio frequency receivers and transmitters and/or optical (e.g., infrared) receivers and transmitters. For example, the Bluetooth (e.g., Bluetooth low energy (BTLE)) and/or WiFi communications described herein may be handled by wireless communication subsystems 624. The specific design and implementation of the communication subsystems 624 may depend on the communication network(s) over which the user device 600 is intended to operate. For example, the user device 600 may include communication subsystems 624 designed to operate over a GSM network, a GPRS network, an EDGE network, a WiFi or WiMax network, and a Bluetooth™ network. For example, the wireless communication subsystems 624 may include hosting protocols such that the device 600 can be configured as a base station for other wireless devices and/or to provide a WiFi service.

An audio subsystem 626 may be coupled to a speaker 628 and a microphone 630 to facilitate voice-enabled functions, such as speaker recognition, voice replication, digital recording, and telephony functions. The audio subsystem 626 may be configured to facilitate processing voice commands, voiceprinting, and voice authentication, for example.

The I/O subsystem 640 may include a touch-surface controller 642 and/or other input controller(s) 644. The touch-surface controller 642 may be coupled to a touch surface 646. The touch surface 646 and touch-surface controller 642 may, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 may be coupled to other input/control devices 648, such as one or more buttons, rocker switches, thumb-wheel, infrared port, USB port, and/or a pointer device such as a stylus. The one or more buttons (not shown) may include an up/down button for volume control of the speaker 628 and/or the microphone 630.

In some implementations, a pressing of the button for a first duration may disengage a lock of the touch surface 646; and a pressing of the button for a second duration that is longer than the first duration may turn power to the user device 600 on or off. Pressing the button for a third duration may activate a voice control, or voice command, module that enables the user to speak commands into the microphone 630 to cause the device to execute the spoken command. The user may customize a functionality of one or more of the buttons. The touch surface 646 can, for example, also be used to implement virtual or soft buttons and/or a keyboard.

In some implementations, the user device 600 may present recorded audio and/or video files, such as MP3, AAC, and MPEG files. In some implementations, the user device 600 may include the functionality of an MP3 player, such as an iPod™. The user device 600 may, therefore, include a 36-pin connector and/or 8-pin connector that is compatible with the iPod. Other input/output and control devices may also be used.

The memory interface 602 may be coupled to memory 650. The memory 650 may include high-speed random access memory and/or non-volatile memory, such as one or more magnetic disk storage devices, one or more optical storage devices, and/or flash memory (e.g., NAND, NOR). The memory 650 may store an operating system 652, such as Darwin, RTXC, LINUX, UNIX, OS X, WINDOWS, or an embedded operating system such as VxWorks.

The operating system 652 may include instructions for handling basic system services and for performing hardware dependent tasks. In some implementations, the operating system 652 may be a kernel (e.g., UNIX kernel). In some implementations, the operating system 652 may include instructions for performing voice authentication.

The memory 650 may also store communication instructions 654 to facilitate communicating with one or more additional devices, one or more computers and/or one or more servers. The memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 may store app instructions and data 672 to perform some of the processing described above.

Each of the above identified instructions and applications may correspond to a set of instructions for performing one or more functions described herein. These instructions need not be implemented as separate software programs, procedures, or modules. The memory 650 may include additional instructions or fewer instructions. Furthermore, various functions of the user device 600 may be implemented in hardware and/or in software, including in one or more signal processing and/or application specific integrated circuits.

In some embodiments, processor 604 may perform processing including executing instructions stored in memory 650, and secure processor 605 may perform some processing in a secure environment that may be inaccessible to other components of user device 600. For example, secure processor 605 may include cryptographic algorithms on board, hardware encryption, and physical tamper proofing. Secure processor 605 may be manufactured in secure facilities. Secure processor 605 may encrypt data/challenges from external devices. Secure processor 605 may encrypt entire data packages that may be sent from user device 600 to the network. Secure processor 605 may separate a valid user/ external device from a spoofed one, since a hacked or spoofed device may not have the private keys necessary to encrypt/decrypt, hash, or digitally sign data, as described herein.

Methods described herein may represent processing that occurs within a system for electronic voting (e.g., system 100 of FIG. 1). The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, such as EPROM, EEPROM, flash memory device, or magnetic disks. The processor and the memory can be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems. In addition, the order of the steps illustrated or described may be changed.

Although the term "at least one" may often be used in the specification, claims and drawings, the terms "a", "an", "the", "said", etc. also signify "at least one" or "the at least one" in the specification, claims and drawings.

The invention claimed is:

1. A computer-implemented method comprising:
receiving, at a server device associated with a financial institution, electronic voter registration information from a voting jurisdiction, the electronic voter registration information valid for one or more elections of the voting jurisdiction;
matching the electronic voter registration information to verified identity information for one or more customers of the financial institution;
storing, in a database communicably coupled to the server device, information indicating that the one or more customers are registered to vote at a polling location associated with the financial institution;
receiving, at an automated teller machine (ATM) associated with the financial institution, one or more vote selections input by the one or more customers; and
transmitting the one or more vote selections from the ATM to the server device.

2. The method of claim 1 wherein receiving the electronic voter registration information from the voting jurisdiction comprises receiving account numbers or other information for the one or more customers, wherein matching the electronic voter registration information to the verified identity information for the one or more customers comprises matching the received account numbers to account numbers or other information stored by the financial institution for the one or more customers.

3. The method of claim 1, further comprises:
receiving authentication credentials from the one or more customers;

identifying a first customer from the one or more customers based on the received authentication credentials;
sending, to the ATM, vote choices; and
storing the vote selections to a secure storage device.

4. The method of claim 3 comprising:
capturing, by one or more sensors coupled to the ATM, biometric data of the first customer; and
storing the biometric data in an auditing database.

5. The method of claim 1 comprising:
capturing, by one or more cameras coupled to the ATM, photo and video data of the one or more customers.

6. A computer-implemented system comprising:
a memory storing instructions; and
a processor that, when executing the instructions, is configured for:
receiving, at a financial institution server device, electronic voter registration information from a voting jurisdiction, the electronic voter registration information valid for one or more elections of the voting jurisdiction;
matching the electronic voter registration information to verified identity information for one or more customers of the financial institution;
storing, in a database communicably coupled to the financial institution server device, information indicating that the one or more customers are registered to vote at a polling location associated with the financial institution;
receiving, at an automated teller machine (ATM) associated with the financial institution, one or more vote selections input by the one or more customers; and
transmitting the one or more vote selections from the ATM to the financial institution server device.

7. The system of claim 6, further comprising:
receiving authentication information from the one or more customers at the ATM; and
securely transmitting the voting information to a voting jurisdiction server device associated with the voting jurisdiction upon authentication of the one or more customers.

8. The system of claim 6, wherein receiving the electronic voter registration information from the voting jurisdiction comprises receiving account numbers or other information for the one or more customers.

9. The system of claim 8, wherein matching the electronic voter registration information to the verified identity information for the one or more customers comprises matching the received the account numbers or the other information to account numbers stored by the financial institution for the one or more customers.

10. The system of claim 6, wherein the processor is further configured for:
capturing, by one or more sensors coupled to the ATM, biometric data of the first customer; and
storing the biometric data in an auditing database.

11. The system of claim 6, wherein the processor is configured for:
receiving authentication credentials from the one or more customers;
identifying a first customer from the one or more customers based on the received authentication credentials; and
sending, to the ATM, vote choices.

12. The system of claim 6, wherein the processor is configured for:
capturing, by one or more cameras coupled to the ATM, photo and video data of the one or more customers.

13. A method comprising:
verifying identities of a plurality of customers of a financial institution;
receiving, by one or more processors of a financial institution server device, authentication credentials for a first customer from the plurality of customers;
authenticating, by the one or more processors, the customer using the received authentication credentials;
determining, based on a current date and a current time, that voting is open for an election associated with a voting jurisdiction;
determining, by the one or more processors, that the first customer is registered to vote in the election at a polling location associated with the financial institution, the polling location comprising an automated teller machine (ATM);
receiving, by the one or more processors, one or more vote selections input by the customer at the polling location; and
securely transmitting the one or more vote selections to a voting jurisdiction server device associated with the voting jurisdiction.

14. The method of claim 13 comprising:
capturing, by one or more sensors coupled to the ATM, biometric data of the first customer; and
storing the biometric data in an auditing database.

15. The method of claim 13 comprising:
capturing, by one or more cameras coupled to the ATM, photo and video data of the one or more customers.

16. The method of claim 13, wherein electronic voter registration information is received from the voting jurisdiction, the electronic voter registration comprising account numbers or other information for the one or more customers.

17. The method of claim 16, further comprising matching the electronic voter registration information to the authentication credentials for the one or more customers.

18. The method of claim 17, wherein the matching comprises matching received account numbers or the other information to account numbers stored by the financial institution for the one or more customers.

* * * * *